(12) United States Patent
Aoki (10) Patent No.: US 9,418,274 B2
(45) Date of Patent: Aug. 16, 2016

(54) BIOMETRIC AUTHENTICATION TECHNIQUE UTILIZING IMAGE DATA OF BOTH HANDS

(71) Applicant: FUJITSU LIMITED, Kawasaki-shi, Kanagawa (JP)

(72) Inventor: Takahiro Aoki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/792,688

(22) Filed: Jul. 7, 2015

(65) Prior Publication Data

US 2015/0310252 A1    Oct. 29, 2015

Related U.S. Application Data

(63) Continuation of application No. PCT/JP2013/050850, filed on Jan. 17, 2013.

(51) Int. Cl.
 G06K 9/00    (2006.01)

(52) U.S. Cl.
 CPC ........ *G06K 9/00033* (2013.01); *G06K 9/00087* (2013.01); *G06K 9/00382* (2013.01); *G06K 2009/00932* (2013.01)

(58) Field of Classification Search
 None
 See application file for complete search history.

(56) References Cited

U.S. PATENT DOCUMENTS

| 8,085,992 | B1 * | 12/2011 | Sahin | G06K 9/00013 382/115 |
|---|---|---|---|---|
| 2008/0002861 | A1 | 1/2008 | Yano et al. | |
| 2008/0226136 | A1 | 9/2008 | Takaku et al. | |

FOREIGN PATENT DOCUMENTS

| JP | 2000-102525 A | 4/2000 |
| JP | 2007-156790 A | 6/2007 |
| JP | 2007-249291 | 9/2007 |
| JP | 2008-009753 | 1/2008 |
| JP | 2008-071158 | 3/2008 |
| JP | 2010-146158 | 7/2010 |
| JP | 2010-224903 | 10/2010 |
| JP | 2010-257007 | 11/2010 |

OTHER PUBLICATIONS

R. M. Luque, et al., "GA-based Feature Selection Approach in Biometric Hand Systems", Proceedings of International Joint Conference on Neural Networks, Jul. 31-Aug. 5, 2011, pp. 246-253 (8 pages).
International Search Report and Written Opinion of the International Searching Authority (Form PCT/ISA/210, Form PCT/ISA/237), mailed in connection with PCT/JP2013/050850 and mailed Mar. 19, 2013 (7 pages). Partial English Translation.
Japanese Office Action mailed on May 10, 2016 for corresponding Japanese Patent Application No. 2014-557248, with Partial English Translation, 4 pages.

* cited by examiner

*Primary Examiner* — Siamak Harandi
(74) *Attorney, Agent, or Firm* — Fujitsu Patent Center (57) ABSTRACT

A biometric authentication apparatus includes a single reading sensor configured to acquire first matching authentication characteristics data being unique to a first hand and used for matching, and second matching authentication characteristics data being unique to a second hand and used for matching; and a communications part configured to externally transmit the first and second matching authentication characteristics data for one person as authentication data and to receive an authentication result.

9 Claims, 9 Drawing Sheets

| IDENTIFICATION NUMBER | NAME OF SHAPE CHARACTERISTICS DATA | DEFINITION | REVERSE IDENTIFICATION NUMBER |
|---|---|---|---|
| 1 | L1L | LEFT SIDE LENGTH OF FIRST FINGER FROM THE LEFT | 6 |
| 2 | L1R | RIGHT SIDE LENGTH OF FIRST FINGER FROM THE LEFT | 5 |
| 3 | L2L | LEFT SIDE LENGTH OF SECOND FINGER FROM THE LEFT | 4 |
| 4 | L2R | RIGHT SIDE LENGTH OF SECOND FINGER FROM THE LEFT | 3 |
| 5 | L3L | LEFT SIDE LENGTH OF THIRD FINGER FROM THE LEFT | 2 |
| 6 | L3R | RIGHT SIDE LENGTH OF THIRD FINGER FROM THE LEFT | 1 |
| 7 | PALM WIDTH | LARGEST VALUE OF PALM WIDTH | 7 |
| 8 | WRIST WIDTH | WIDTH IN THE VICINITY OF WRIST | 8 |

SECOND TIME    FIRST TIME

BIOMETRIC AUTHENTICATION TECHNIQUE UTILIZING IMAGE DATA OF BOTH HANDS

CROSS-REFERENCE TO RELATED APPLICATIONS

This application is a continuation application of International Application PCT/JP2013/050850 filed on Jan. 17, 2013 and designated the U.S., the entire contents of which are incorporated herein by reference.

FIELD

The disclosures discussed herein are related to a biometric authentication apparatus, a biometric authentication system, and a biometric authentication method.

BACKGROUND

Biometric authentication indicates a technology to identify individuals by using biometric information such as fingerprint patterns or vein patterns. Fingerprint patterns on the surfaces of one's fingers or palms vary among individuals, and hence individuals may be identified by using these patterns. Veins of the palm or the like may be imaged by using near infrared radiation. The vein patterns vary among individuals so that individuals may be identified by the vein patterns.

Biometric authentication includes different types of authentication, namely, 1:1 authentication and 1:N authentication. The 1:1 authentication includes inputting an ID of each individual, and matching new biometric information and the registered biometric information of the individual. The 1:N authentication includes matching new biometric information and all the data of registered biometric information without inputting IDs or the like of the individuals. The 1:N authentication is convenient because IDs of individuals need not be input. However, the 1:N authentication may increase a rate of erroneously identifying a wrong person as the matched individual (a false acceptance rate, hereinafter called "FAR") along with an increase in the number of N because new biometric information is matched with all the data of the registered biometric information. It is preferable that the accuracy in large-scale 1:N authentication be high.

In performing biometric authentication of individuals based on biometric information, matching a position of a living body at registration and its position at authentication relative to a sensor capturing biometric information may increase the matching accuracy as well as improving the accuracy of authentication. For example, there is a technology known in the art to guide a position of a living body at authentication by displaying an image of the living body captured at registration as a guide image. Further, there are technologies known in the art to guide a position of a hand of a person to be authenticated without delaying authentication operations regardless of the right hand and the left hand being held over a sensor (e.g., Patent Documents 1 and 2 described below).

However, in such related art technologies, the position of one of the left hand and the right relative to the sensor is matched at registration and at authentication as biometric information. Further, one of the left hand and the right hand captured as an image of the hand at registration is displayed as a guide image to guide the position of the hand at authentication.

Even though the positions of the living body at registration and at authentication are matched, it may be difficult to increase the matching accuracy to improve the accuracy of the authentication. Hence, there seems to be a limit to the reduction of FAR. To implement ten million accurate biometric authentications as well as introducing the biometric authentication into public services or the like of the government, FAR needs to be reduced even further.

To reduce FAR, matching the biometric information of the left and right hands may be considered. In this case, when matching the left and right hands is conducted using the same sensor, angles of the left and right hands held over the sensor are different unless the person to be authenticated is moved. When the biometric information of the left and right hands is registered at the same angles relative to the body of the person to be authenticated, the authentication is conducted without interruption when the person places or holds one of the hands at an angle similar to the angle at registration. However, the authentication may be interrupted when the person places or holds the other one of the hands at the angle differing from the angle at registration.

RELATED ART DOCUMENTS

Patent Documents

Patent Document 1: Japanese Laid-open Patent Publication No. 2008-71158
Patent Document 2: Japanese Laid-open Patent Publication No. 2010-146158

SUMMARY

According to an aspect of the present invention, there is provided a biometric authentication apparatus that includes a single reading sensor configured to acquire first matching authentication characteristics data being unique to a first hand and used for matching, and second matching authentication characteristics data being unique to a second hand and used for matching; and a communications part configured to externally transmit the first and second matching authentication characteristics data for one person as authentication data and to receive an authentication result.

The object and advantages of the embodiment will be realized and attained by means of the elements and combinations particularly pointed out in the claims. It is to be understood that both the foregoing general description and the following detailed description are exemplary and explanatory and are not restrictive of the invention as claimed.

DESCRIPTION OF EMBODIMENTS

In the following, a detailed description is given of embodiments with reference to the accompanying drawings. Note that in the drawings, components having the same functions are provided with the same reference numbers, and a duplicated description is omitted from the specification.

First Embodiment

Outline of Biometric Authentication System

Figure 1:
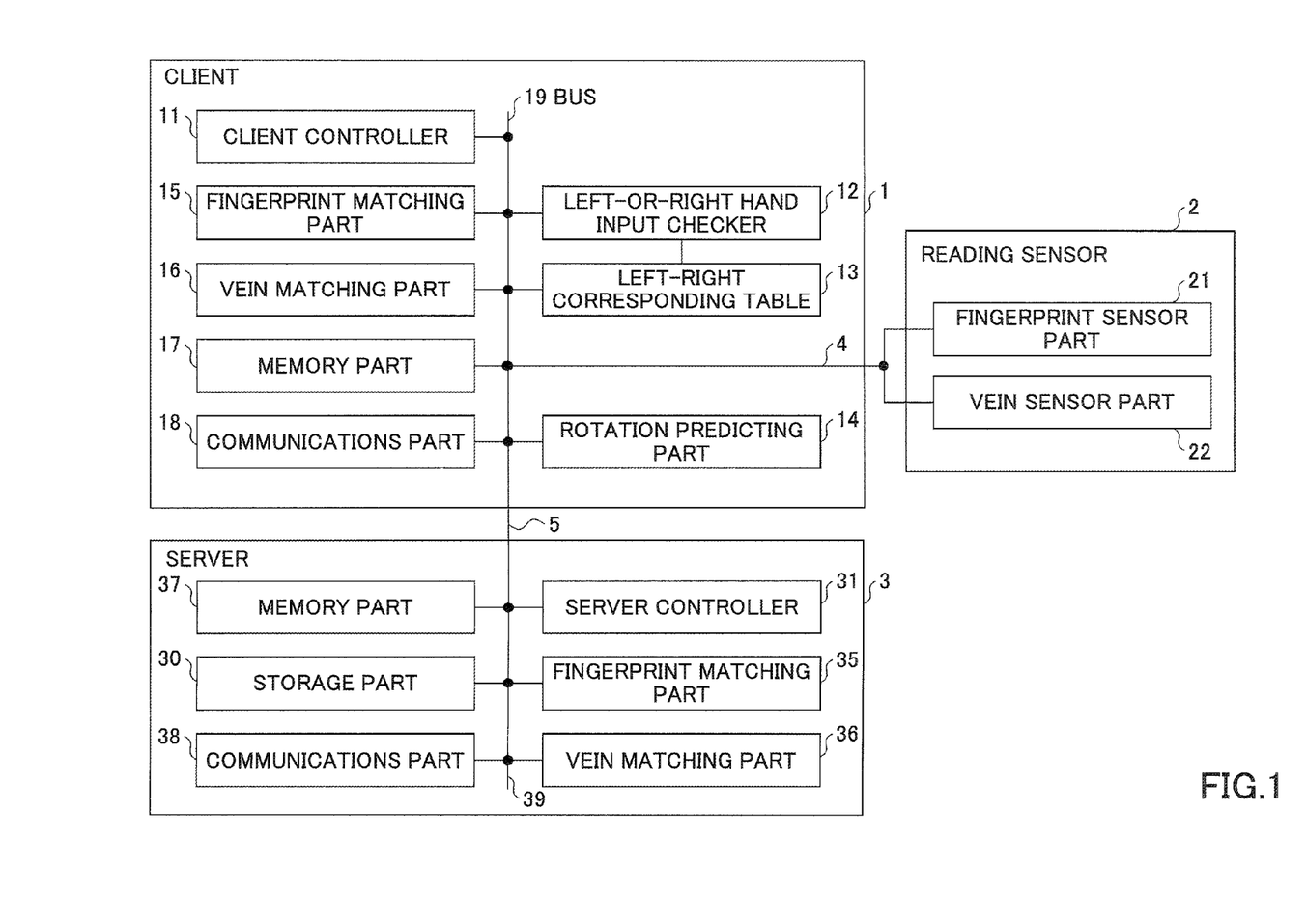
FIG. 1 is a diagram illustrating a configuration example of a biometric authentication system in a first embodiment.

FIG. 1 is a diagram illustrating a configuration example of a biometric authentication system in a first embodiment. The first embodiment illustrates an example of the biometric information using fingerprints of both the left and the right hands and palm veins of both the left and the right hands. As illustrated in FIG. 1, the biometric authentication system in the first embodiment includes a client 1, a reading sensor 2, a server 3, a communications channel 4 connecting the client 1 and the reading sensor 2, and a communications channel 5 connecting the client 1 and the server 3.

The client 1 may, for example, be a personal computer (PC). The client 1 includes a client controller 11, a left-or-right hand input checker 12, a left-right corresponding table 13, a rotation predicting part 14, a fingerprint matching part 15, a vein matching part 16, a memory part 17, a communications part 18, and a bus 19. The client controller 11 is configured to control the client 1. The left-or-right hand input checker 12 is configured to check which one of the left and right hands of the person to be authenticated is used to input biometric information. The left-right corresponding table 13 is configured to store a relationship between the left and right hands in terms of shapes of the left and the right hands of the person to be authenticated. The rotation predicting part 14 is configured to predict an input angle of biometric information of one of the left and right hands of the person to be authenticated relative to an input angle of the biometric information of the other hand. The fingerprint matching part 15 is configured to match characteristics of fingerprints of the person to be authenticated. The fingerprint matching part 15 is used for a later-described left or right hand input check. The vein matching part 16 is configured to match characteristics of veins of the person to be authenticated. The vein matching part 16 is used for the later-described left or right hand input check. The memory part 17 is used as a work area for maintaining images associated with the captured biometric information or a later-described matching process. The communications part 18 is configured to perform communications processes with the communications channel 5 and/or the server 3. The bus 19 is configured to connect the client controller 11, the left-or-right hand input checker 12, the left-right corresponding table 13, the rotation predicting part 14, the fingerprint matching part 15, the vein matching part 16, the memory part 17, and the communications part 18 with one another.

The reading sensor 2 includes a fingerprint sensor part 21 and a vein sensor part 22. The fingerprint sensor part 21 is configured to read the fingerprints of the person to be authenticated as an image. The vein sensor part 22 is configured to read the veins of the person to be authenticated as an image.

The server 3 may, for example, be a server (SV), a computer, or a personal computer (PC). The server 3 includes a storage part 30, a server controller 31, a fingerprint matching part 35, a vein matching part 36, a memory part 37, a communications part 38, and a bus 39.

The storage part 30 is configured to save a registration template of biometric information. The server controller 31 is configured to control the entire server 3. The fingerprint matching part 35 is configured to match characteristics of the fingerprints of the person to be authenticated. The vein matching part 16 is configured to match characteristics of veins of the person to be authenticated. The memory part 37 is used as a work area for maintaining images associated with the captured biometric information or a later-described matching process. The communications part 38 is configured to perform communications processes with the communications channel 5 and/or the client 1. The bus 39 is configured to connect the storage part 30, the server controller 31, the fingerprint matching part 35, the vein matching part 36, the memory part 37, and the communications part 38 with one another.

The communications channel 4 may be wired or wireless, and configured to enable communications between the client 1 and the reading sensor 2. Various types of the communications channel 4 may be used including a USB cable, FireWire (registered trademark), the Internet, a local area network, Wi-Fi (registered trademark), and Bluetooth (registered trademark).

The communications channel 5 may be wired or wireless, and configured to enable communications between the client 1 and the server 3. Various types of the communications channel 4 may be used including a USB cable, FireWire ("FireWire" is a registered trademark), the Internet, a local area network, Wi-Fi ("Wi-Fi" is a registered trademark), and Bluetooth ("Bluetooth" is a registered trademark).

Figure 2:
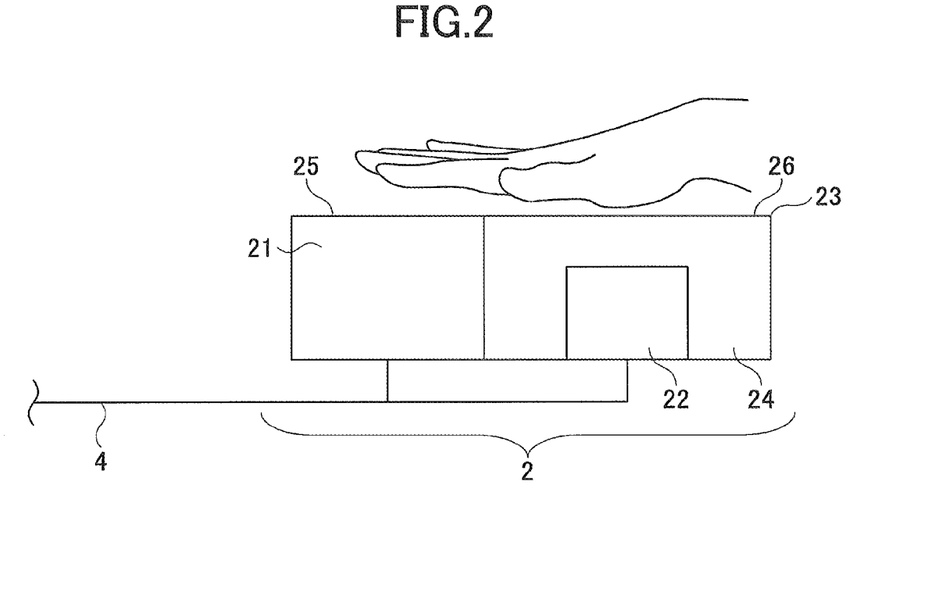
FIG. 2 is a side view illustrating an example of a reading sensor in the first embodiment.
Figure 3:
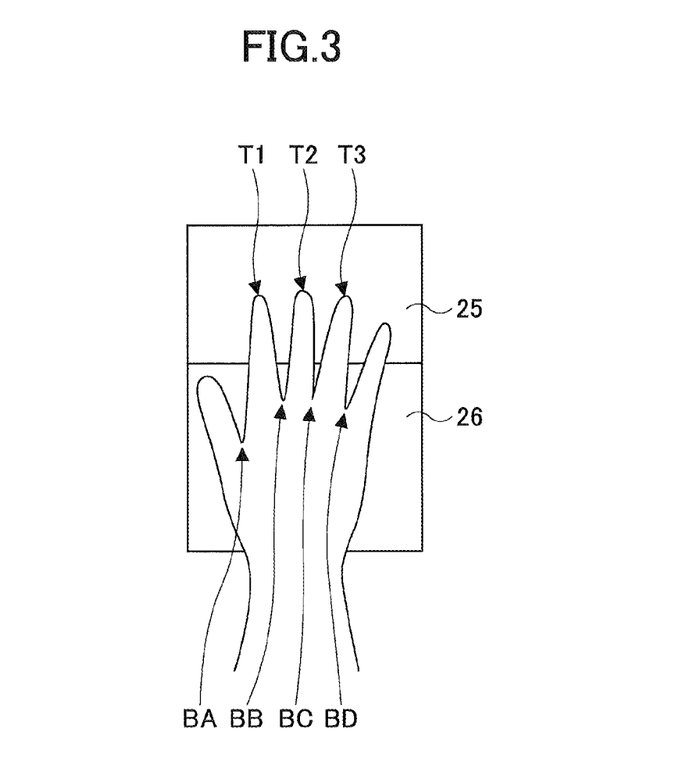
FIG. 3 is a top view illustrating the example of the reading sensor in the first embodiment.

An illustration is given of an example of the reading sensor 2 with reference to FIGS. 2 and 3. FIG. 2 is a side view illustrating the example of the reading sensor 2. FIG. 3 is a top view illustrating the example of the reading sensor 2. The reading sensor 2 further includes a guide 23, a case 24, a fingerprint reading range 25, and a vein reading range 26, in addition to the fingerprint sensor part 21 and the vein sensor part 22 illustrated in FIG. 1. The guide part 23 is configured to guide the hand to be held at an appropriate position over the fingerprint sensor part 21 or the vein sensor part 22 for capturing the biometric information. For example, a wall may be provided at each side of the hand as the guide 23 so as not to move the hand toward left or right. The case 24 is configured to house the fingerprint sensor part 21, the vein sensor part 22, and the guide 23. The fingerprint reading range 25 is located above the fingerprint sensor part 21, and is configured to read a fingerprint upon placing a ball of a finger in the fingerprint reading range 25. The vein reading range 26 is located above the vein sensor part 22, and configured to read an image of palm veins upon placing a palm of a hand in the vein reading range 26.

The reading sensor 2 is configured to image fingerprints of three fingers (forefinger, middle finger and annular finger) and palm veins of the hand. In a sensor using two or more types of biometric information (a multimodal type) such as the fingerprints and the palm veins of the hand, authentication may be accurately conducted by improving the matching accuracy.

Registration Process of Biometric Information

An illustration is given below of an example of authentication using biometric information of both the left and right hands in order to more accurately perform large-scale 1:N authentication by improving the matching accuracy without increasing FAR. Of the biometric information, a characteristics amount subject to comparison includes fingerprints of both hands (left and right hands), palm veins of both hands (left and right hands), or a combination of the fingerprints of both hands (left and right hands) and the palm veins of both hands (left and right hands).

Figure 4:
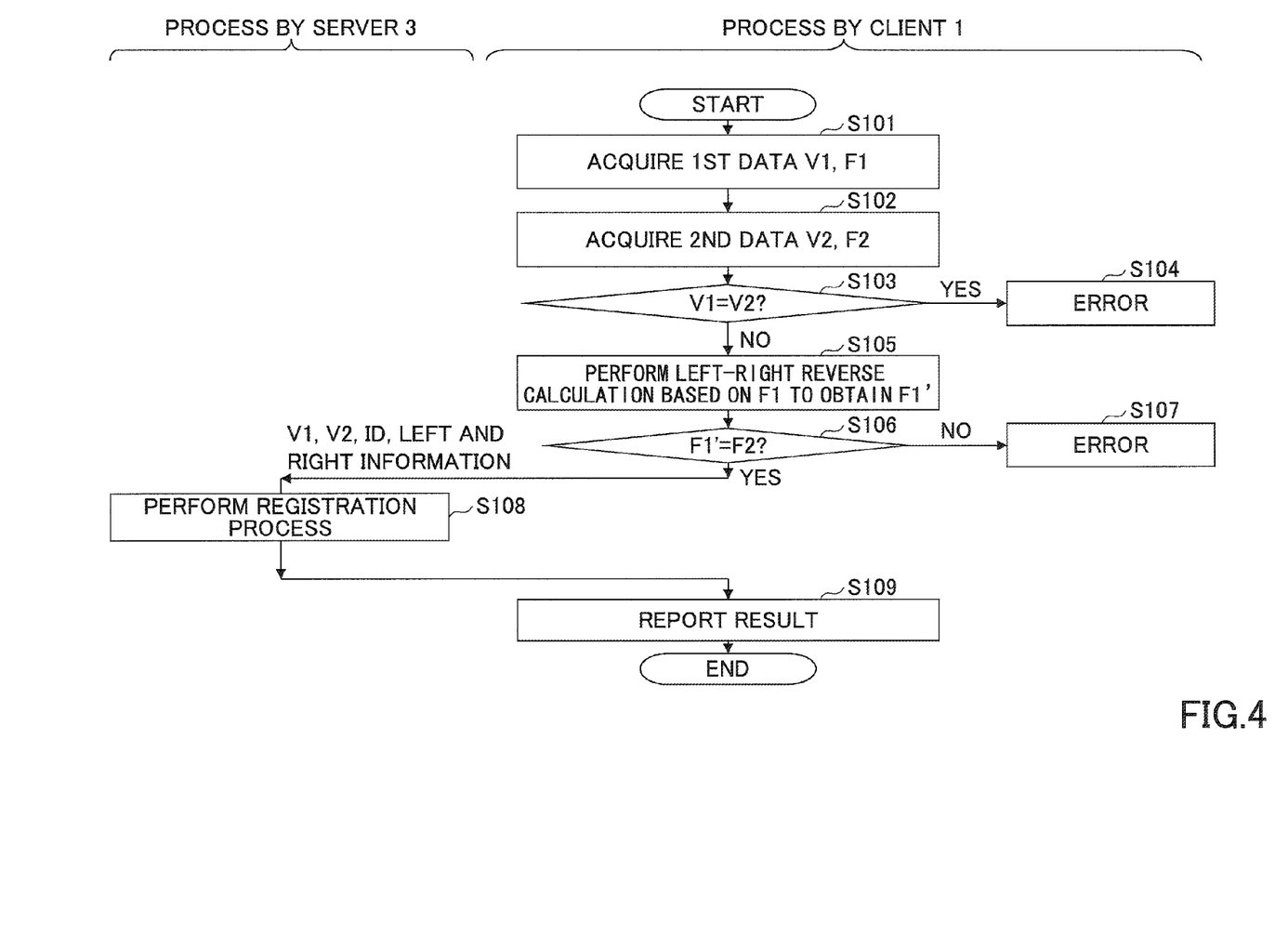
FIG. 4 is a flowchart illustrating a registration process of the biometric information in the first embodiment.

FIG. 4 is a flowchart illustrating a registration process of the biometric information in the first embodiment. The flowchart illustrated in FIG. 4 intends that the first data acquisition is performed by inputting biometric information from one of the hands (first hand) of the person to be authenticated. Likewise, it intends that the second data acquisition is performed by inputting biometric information from the other hand (second hand) of the person to be authenticated. However, despite the above intentions, the first data and the second data may be acquired by the biometric information input from the same hand of the person to be authenticated. In such a case, the biometric information fails to be registered with accuracy.

Hence, the following process may be performed, an example of which is illustrated in FIG. 4. Note that V1, V2, F1, F2, and F1' may be defined as follows. V1 indicates authentication characteristics data (characteristics data of fingerprints of three fingers and palm veins) acquired for registration in the first data acquisition. V2 indicates authentication characteristics data (characteristics data of fingerprints of three fingers and palm veins) acquired for registration in the second data acquisition. F1 indicates shape characteristics data of an outer shape of a hand acquired in the first data acquisition. F2 indicates shape characteristics data of an outer shape of a hand acquired in the second data acquisition. F1' indicates reversed shape characteristics data extracted by mirror reversing the shape characteristics data of the outer shape of the hand acquired in the first data acquisition (N. B., "mirror reverse" is synonymous with "left-right image reverse"). Note that the characteristics data indicate information necessary for authentication or information necessary for comparisons of shapes that is extracted from images. Examples of the authentication characteristics include palm vein patterns, characteristics points (minutiae) of the fingerprint, and the like. Examples of the shape characteristics include a length of a finger, a width or a contour of a hand, and the like.

For example, steps S101 and S102 are performed by the reading sensor 2. Steps S103 to S107 are performed by the client 1. Step S108 is performed by the server 3.

In step S101, the first data acquisition is performed by the reading sensor 2. The authentication characteristics data acquired in this step are V1. Further, the shape characteristics data acquired in this step are F1.

Figure 5:
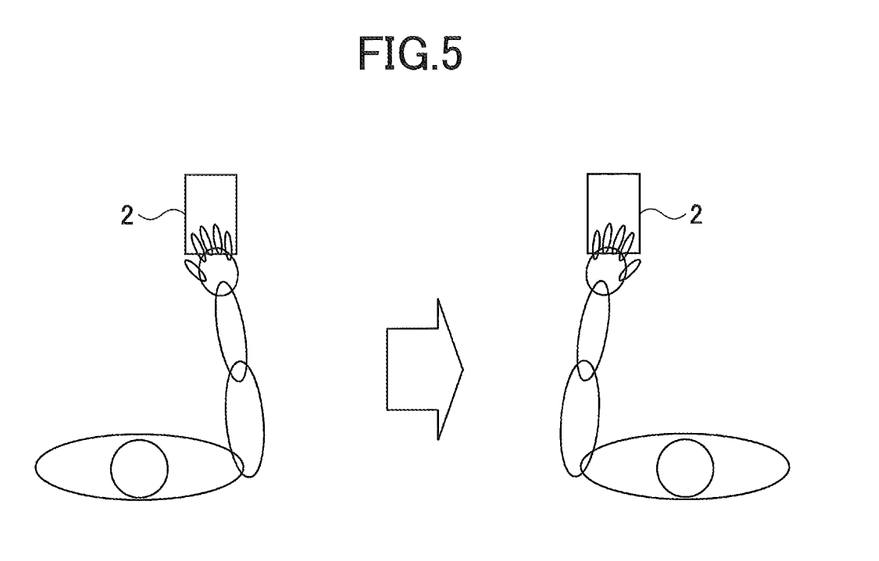
FIG. 5 is a diagram illustrating a model of the registration process of the biometric information in the first embodiment.

In step S102, the second data acquisition is performed by the reading sensor 2. The authentication characteristics data acquired in this step are V2. Further, the shape characteristics data acquired in this step are F2. FIG. 5 is a diagram illustrating a model of the registration process of the biometric information in the first embodiment. As illustrated in FIG. 5, right hand data are acquired in the first data acquisition, and left hand data are acquired in the second data acquisition, for example. In this case, in both the first right hand data acquisition and the second left hand data acquisition, the hands are disposed approximately in parallel with a longitudinal direction of the reading sensor 2 to acquire the first and second data.

Note that the first and second data acquisition in steps S101 and S102 may be performed by a different reading sensor or the like other than the reading sensor 2.

In step S103, the fingerprint matching part 15 and the vein matching part 16 determine whether the authentication characteristics data V1 and the authentication characteristics data V2 are identical. When the determination indicates that the authentication characteristics data V1 and the authentication characteristics data V2 are identical ("YES" in step S103), step S104 is processed. When the determination indicates that the authentication characteristics data V1 and the authentication characteristics data V2 are not identical ("NO" in step S103), step S105 is processed.

In step S104, the client controller 11 determines that the first and second data acquisition are performed by the same-side hand of the same person being held twice, and hence, the client controller 11 determines that the same data are acquired twice. Thus, the client controller 11 determines the above data acquisition as an error to terminate the process.

In step S105, the client controller 11 or the left-or-right hand input checker 12 calculates the reversed shape characteristics data F1' to obtain the calculated result. The reversed shape characteristics data F1' are calculated by mirror reversing (left-right image reversing) the shape characteristics data F1 of the hand acquired in the first data acquisition in step S101.

In step S106, the client controller 11 or the left-or-right hand input checker 12 compares the reversed shape characteristics data F1' and the shape characteristic data F2 to determine whether the reversed shape characteristics data F1' match the shape characteristic data F2 in a predetermined range. When the reversed shape characteristics data F1' do not match the shape characteristic data F2 in the predetermined range ("NO" in step S106), step S107 is processed. When the reversed shape characteristics data F1' match the shape characteristic data F2 in the predetermined range ("YES" in step S106), step S108 is processed. In step S106 ("YES"), the lengths of the fingers or the shape of the hand such as the contour are compared after reversing the shape characteristics of the hand. When the reversed shape characteristics data F1' match the shape characteristics data F2, it is determined that the shape characteristics data of both the left and the right hands of the same person are acquired. In this process, the authentication characteristics data V1 and the authentication characteristics data V2 of the hands of the same person, an ID specifying the person subject to the acquisition of the authentication characteristics data V1 and the authentication characteristics data V2, and information identifying which of the authentication characteristics data V1 and the authentication characteristics data V2 correspond to the left or the right hand are transmitted from the client 1 via the communications part 18 to the server 3. Note that at registration, it may be predetermined that the first data are acquired from the right hand, and the second data are acquired from the left hand.

In step S107, the client controller 11 determines that the first data and the second data are acquired from hands of different persons. Thus, the client controller 11 determines the above data acquisition as an error to terminate the process.

In step S108, in the server 3, the authentication characteristics data V1 and the authentication characteristics data V2 are registered in association with IDs. The server controller 31 registers in the storage part 30 the authentication characteristics data V1 and the authentication characteristics data V2 in association with a corresponding ID.

In step S109, the server 3 sends a report of completion of registration to the client 1. The registration process is thus completed.

In the following, an illustration is given of the calculation of mirror reversing (left-right image reversing) the shape characteristics data F1 of the hand performed in step S105, and determination of whether the reversed shape characteristics data F1' match the shape characteristics data F2 in step S106.

First, the shape characteristics data F1 are described. In this embodiment, the shape characteristics data F1 are acquired based on an image captured by the fingerprint sensor part 21 and an image captured by the vein sensor part 22. Specifically, the lengths of fingers, the width of the palm, and the width of the wrist may be used as the shape characteristics data.

An illustration is given of an example of utilizing respective lengths of the forefinger, middle finger and annular finger as the shape characteristics data F1 with reference to FIG. 3.

In FIG. 3, T1 indicates coordinates of a fingerprint center of the first finger (forefinger) from the left. T2 indicates fingerprint central coordinates of the second finger (middle finger) from the left. T3 indicates fingerprint central coordinates of the third finger (annular finger) from the left. BA indicates coordinates of the left-side base of the first finger (forefinger) from the left. BB indicates coordinates of the right-side base of the first finger (forefinger) from the left, and the left-side base of the second finger (middle finger) from the left. BC indicates coordinates of the right-side base of the second finger (middle finger) from the left, and the left-side base of the third finger (annular finger) from the left. BD indicates coordinates of the right-side base of the third finger (annular finger) from the left.

The lengths of the fingers are calculated based on the respective differences between the fingerprint central coordinates T1, T2, and T3 acquired from the fingerprints, and the finger base coordinates BA, BB, BC, and BD acquired from the vein image. Note that the length of a finger includes the lengths of two sides of the finger. The left side length L1L of the first finger (forefinger) from the left is obtained by T1-BA. The right side length L1R of the first finger (forefinger) from the left is obtained by T1-BB. The left side length L2L of the second finger (middle finger) from the left is obtained by T2-BB. The right side length L2R of the second finger (middle finger) from the left is obtained by T2-BC. The left side length L3L of the third finger (annular finger) from the left is obtained by T3-BC. The right side length L3R of the third finger (annular finger) from the left is obtained by T3-BD.

Figure 6:
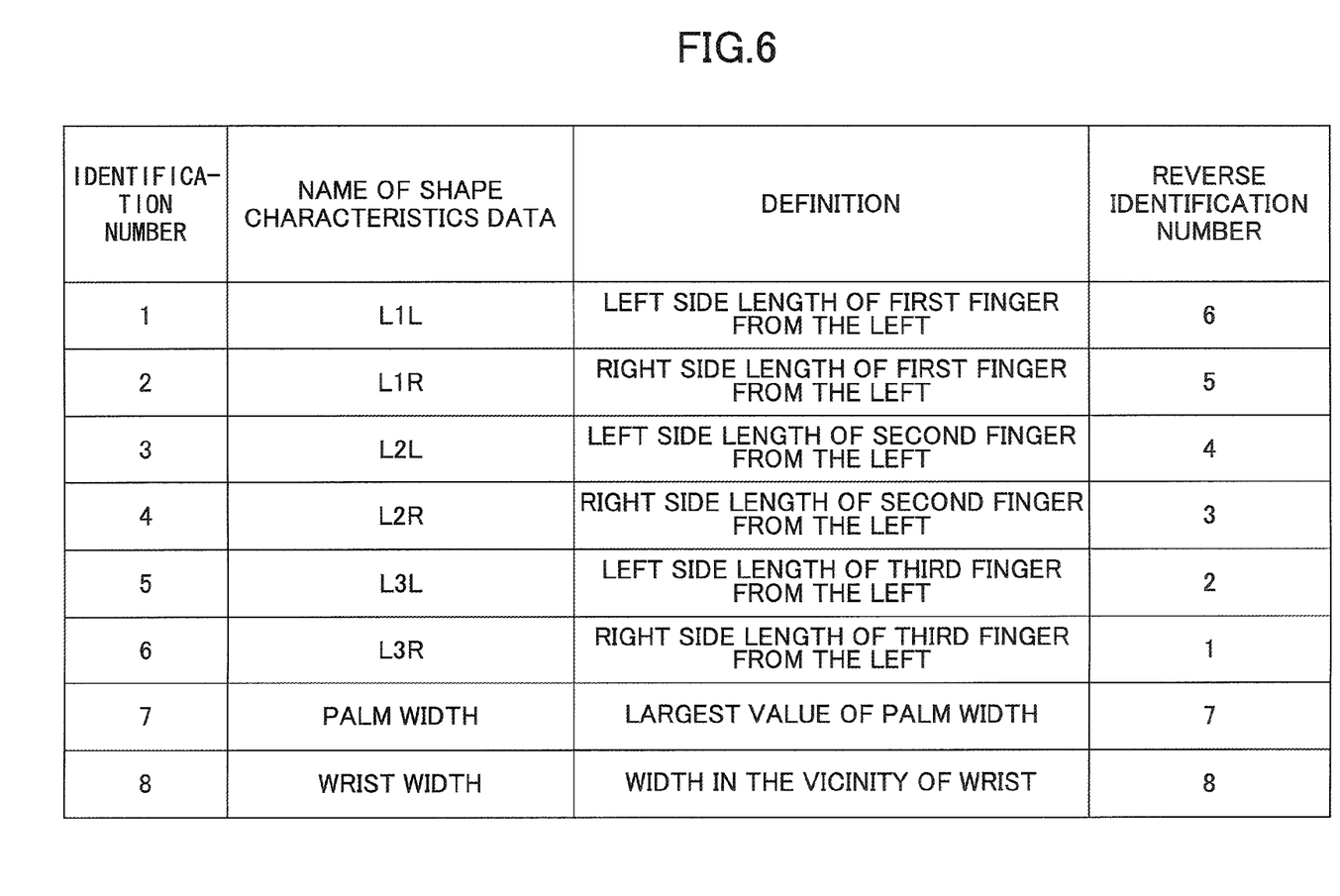
FIG. 6 is a diagram illustrating a table having an example of shape characteristics data in the first embodiment.

FIG. 6 is a left-right corresponding table illustrating an example of shape characteristics data in the first embodiment. The shape characteristics data F1 may include the above-described lengths L1L, L1R, L2L, L2R, L3L, and L3R of the fingers, the width of the palm, and the width of the wrist. The lengths L1L, L1R, L2L, L2R, L3L, and L3R of the fingers, the width of the palm, and the width of the wrist are provided with respective identification numbers 1 to 8 of the shape characteristics data.

The calculation of mirror reversing (left-right image reversing) the characteristics data F1 in step S105 is performed on the basis of the assumption of an image of the hand illustrated in FIG. 3 being plane-symmetrical relative to plane of the palm. The reversed shape characteristics data F1' have the following features. The reversed shape characteristics data F1' indicate no change in the width of the palm and the width of the wrist of the respective identifications numbers 7 and 8. Thus, in the reversed shape characteristics data F1', reverse identification numbers 7 and 8 that are the same as the identification numbers are assigned to the width of the palm and the width of the wrist. On the other hand, the lengths of the first finger, the second finger, and the third finger from the left correspond to the lengths of the annular finger, the length of the middle finger, and the length of the forefinger, which indicates that the reversed shape characteristics data F1' differ from the shape characteristics data F1. Hence, as illustrated in FIG. 6, the lengths L1L, L1R, L2L, L2R, L3L, and L3R of the fingers for the reversed shape characteristics data F1' are provided with reverse identification numbers 6 to 1. Accordingly, the reversed shape characteristics data F1' are acquired as data having the respective lengths of the fingers corresponding to the reverse identification numbers.

In step S106, the left-or-right hand input checker 12 determines whether the hand shape characteristics data F2 acquired in the second data acquisition match the reversed shape characteristics data F1' obtained as described above. The left-or-right hand input checker 12 compares the shape characteristics data F2 and the reversed shape characteristics data F1 having the reverse identification numbers identical to the identification numbers of the shape characteristics data F2. When the shape characteristics data F1 match the shape characteristics data F2 in a predetermined range, the left-or-right hand input checker 12 determines that the reversed shape characteristics data F1' match the shape characteristics data F2 ("YES" in step S106).

Note that the first embodiment has described an example of determining whether the reversed shape characteristics data F1' match the shape characteristics data F2 utilizing the left-right corresponding table 13 (step S106). However, the characteristics amount may be extracted by mirror reversing the first input image.

In the first embodiment, whether the reversed shape characteristics data F1' match the shape characteristics data F2 (step S106) is determined by the client 1. The loads on the communications channel 5 such as the network and the server 3 may be reduced by causing the client 1 to determine whether the reversed shape characteristics data F1' match the shape characteristics data F2. However, the invention is not limited to this example. The server 3 may instead determine whether the reversed shape characteristics data F1' match the shape characteristics data F2 (step S106).

Figure 7:
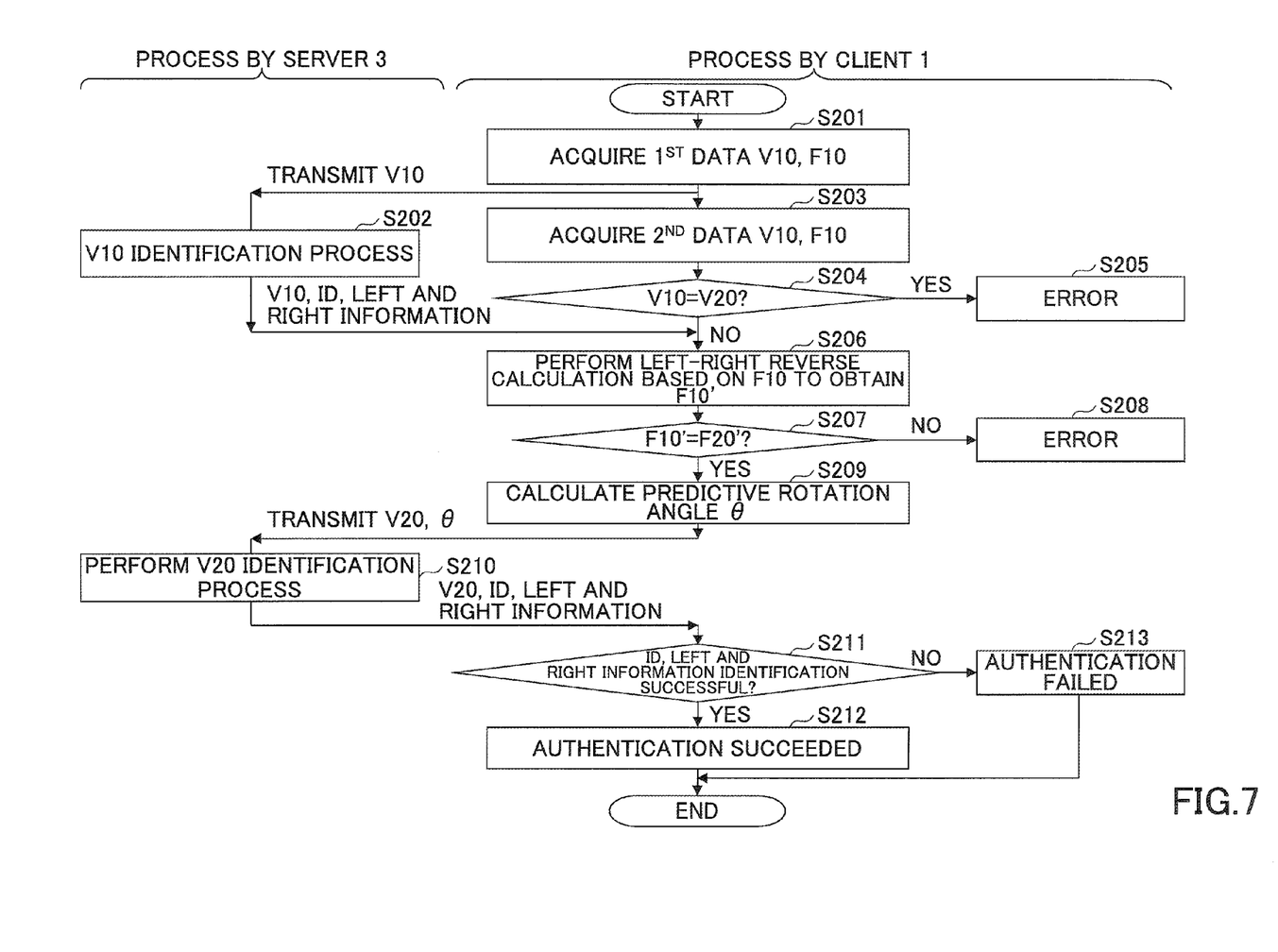
FIG. 7 is a flowchart illustrating a matching process of the biometric information in the first embodiment.

FIG. 7 is a flowchart illustrating a matching process of the biometric information in the first embodiment.

Mathcing Process of Biometric Information

For example, steps S201 and S203 are performed by the reading sensor 2. Steps S203 to S207, step S209, and steps S211 to S213 are performed by the client 1. Steps S202 and S211 are performed by the server 3.

In step S201, the first data acquisition is performed by the reading sensor 2. The authentication characteristics data acquired in this step are V10. Further, the shape characteristics data acquired in this step are F10. The acquired authentication characteristics data V10 are transmitted to the server 3.

In step S202, the server 3 identifies the acquired authentication characteristics data V10. The fingerprint matching part 35 and the vein matching part 36 of the server 3 perform the matching process of extracting registration authentication characteristics data that match the acquired authentication characteristics data V10 in a predetermined range from the registration authentication characteristics data V1 stored in a storage. From the registration authentication characteristics data V1 that match the acquired authentication characteristics data V10, an ID corresponding to a person to be authenticated, and left-right information indicating that the registration authentication characteristics data V1 are associated with one of the left and right hand of the person are specified. Then, the ID of the person to be authenticated corresponding to the authentication characteristics data V10, and the left-right information of the hand are transmitted from the server 3 to the client 1.

Figure 8:
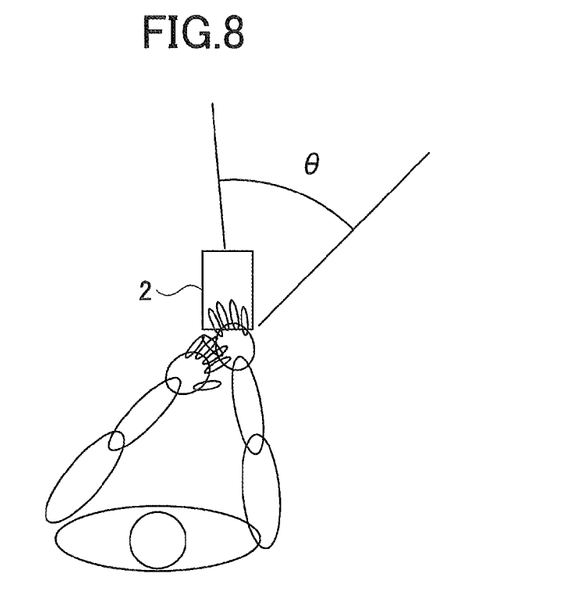
FIG. 8 is a diagram illustrating a model of the matching process of the biometric information in the first embodiment.

In step S203, the second data acquisition is performed by the reading sensor 2. The authentication characteristics data acquired in this step are V20. Further, the shape characteristics data acquired in this step are F20. FIG. 8 is a diagram illustrating a model of the matching process of the biometric information in the first embodiment. As illustrated in FIG. 8, right hand data are acquired in the first data acquisition, and left hand data are acquired in the second data acquisition, for example. In this case, in the first right hand data acquisition, the right hand is disposed approximately in parallel with a longitudinal direction of the reading sensor 2 to acquire data. However, in the second left hand data acquisition, a longitudinal direction of the left palm may likely be disposed oblique so as to form an angle relative to the longitudinal direction of the reading sensor 2.

That is, in the registration process of the biometric information illustrated in FIG. 5, the highly accurate authentication characteristics data V1 and V2 are acquired for reducing FAR. Hence, an operator intervenes in carefully arranging each of the left and right hands of the person to be authenticated such that the longitudinal direction of the corresponding palm is approximately in parallel with the longitudinal direction of the reading sensor 2 to acquire data. By contrast, in the matching process of the biometric information illustrated in FIG. 8, the person to be authenticated is unlikely to hold his or her hand slowly and carefully. That is, the person to be authenticated may hold the hand over the reading sensor 2 for acquiring the second data while continuously standing in the standing position determined in the first data acquisition. As a result, in the second left hand data acquisition, a longitudinal direction of the left palm may likely be disposed oblique so as to form an angle θ relative to the longitudinal direction of the reading sensor 2.

In step S204, whether the authentication characteristics data V10 and the authentication characteristics data V20 are identical is determined by the fingerprint matching part 15 and the vein matching part 16. When the determination indicates that the authentication characteristics data V10 and the authentication characteristics data V20 are identical ("YES" in step S204), step S205 is processed. When the determination indicates that the authentication characteristics data V10 and the authentication characteristics data V02 are not identical ("NO" in step S204), step S206 is processed.

In step S205, the client controller 11 determines that the first and second data are acquired from the same-side hand of the same person, so that the same data are acquired twice. Thus, the client controller 11 determines the above data acquisition as an error to terminate the process. At this time, the reading sensor 2 may display a message such as "Please hold the other hand over the reading sensor". The person to be authenticated may be likely to mistake input operations by alternately placing the left hand and the right hand because the person to be authenticated is generally not accustomed to such operations. Hence, the above message or the like is prepared for appropriately guiding the person to be authenticated when the person wrongly holds the same hand over the reading sensor 2 twice. Accordingly, the biometric authentication system having superior usability may be provided.

Note that the biometric authentication system may further include a configuration to compare the shape characteristics data F1 subject to the first data acquisition and the shape characteristics data F2 subject to the second data acquisition. That is, the shape characteristics data F1 may be compared with the shape characteristics data F2 without mirror reversing (left-right image reversing) the shape characteristics data F1. When the first and second shape characteristics data are input by using the same hand twice, the first and second shape characteristics data are matched. However, when the first and second shape characteristics data do not match despite the fact that the first and second authentication characteristics data are matched, it may be determined that some kind unauthorized operation is performed. In this case, a warning may be generated.

In step S206, the client controller 11 or the left-or-right hand input checker 12 calculates the reversed shape characteristics data F10'. The reversed shape characteristics data F10' are calculated by mirror reversing (left-right image reversing) the shape characteristics data F10 of the hand acquired in the first data acquisition in step S201. The calculation of the reversed shape characteristics data F10 is similar to the calculation of the reversed shape characteristics data in the registration process in FIG. 4, and a duplicated illustration is omitted from the specification.

In step S207, the client controller 11 or the left-or-right hand input checker 12 compares the shape characteristics data F10' and the shape characteristic data F20 to determine whether the shape characteristics data F10' match the shape characteristic data F20 in a predetermined range. When the shape characteristics data F10' do not match the shape characteristic data F20 in the predetermined range ("NO" in step S207), step S208 is processed. When the shape characteristics data F10' match the shape characteristic data F20 in the predetermined range ("YES" in step S207), step S208 is processed.

In step S208, the client controller 11 determines that the first data and the second data are acquired from the hands of different persons, and generates an error to terminate the process. At this time, the reading sensor 2 may display a message such as "Please replace the hand with a hand of yourself". It may be assumed that an input operation differing from the original operation be intentionally performed. Such input operations may be performed for the purpose of spoofing or simple mischief. In this case, unintended load may be applied to the system. Further, it may be necessary to prepare for an attack such as temporarily or indefinitely interrupting or suspending services of a server by simultaneously transmitting a large amount of inappropriately acquired data. The display of the above message may improve the convenience of the person to be authenticated as well as reducing the system load by eliminating spoofing, mischief, and the attack in the early stage.

Figure 9:
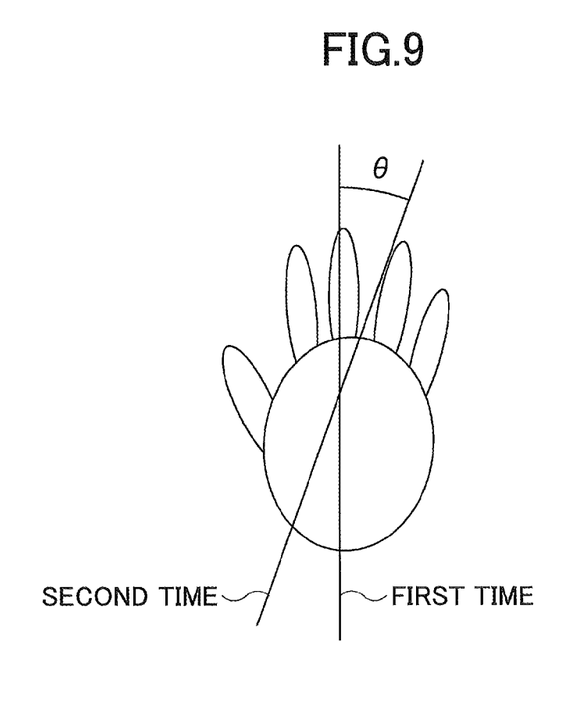
FIG. 9 is a diagram illustrating a rotation of a hand in the first embodiment.

In step S209, the rotation predicting part 14 calculates a prediction rotational angle θ. The rotation predicting part 14 predicts an approximate rotational angle of a longitudinal direction of one hand (e.g., a left hand) subject to the second data acquisition relative to a longitudinal direction of the other hand (e.g. a right hand) subject to the first data acquisition. FIG. 9 is a diagram illustrating a rotation of a hand in the first embodiment. The prediction rotational angle θ indicates a rotational angle of one hand (e.g., a left hand) subject to the second data acquisition that is predicted relative to the other hand (e.g., a right hand) subject to the first data acquisition. The rotational angle is provided with a plus (+) sign when one hand subject to the second data acquisition rotates relative to the other hand subject to the first data acquisition in a clockwise direction in FIG. 9, whereas the rotational angle is provided with a minus (−) sign when one hand subject to the second data acquisition rotates relative to the other hand subject to the first data acquisition in a counterclockwise direction in FIG. 9. In this case, the rotational angle indicates a rotational angle in a plane when the center of the palm is positioned approximately at an axis of rotation, as illustrated in FIG. 9.

The prediction accuracy may be improved by determining the prediction rotational angle θ based on a function having a size of the hand SH as an input as noted below in a formula (1). In this formula (1), SH indicates a value representing the size of the palm, an example of which may be an area of the palm.

Formula (1)

$$\theta = F(S_H) = aS_H + b \qquad (1)$$

In this formula (1), a and b indicate coefficients previously set by conducting an experiment or the like. Note that when SH represents an area of the palm, an area such as an area of the palm may be calculated based on an overall contour of the shape characteristics data F10 acquired in the first data acquisition in step S201, or the shape characteristics data F20 acquired in the second data acquisition in step S203.

The prediction rotational angle θ may be calculated based on the value SH representing the size of the hand of the person to be authenticated because it is experimentally known that the person to be authenticated tends to have a larger size of the body as he or she has a larger size of the hand, and the prediction rotational angle θ tends to be greater as the person to be authenticated has a larger size of the body. FIGS. 10A to 10D are diagrams illustrating a relationship of the size of the body and the rotation of the hand between persons having different sizes of the body.

Figure 10A:
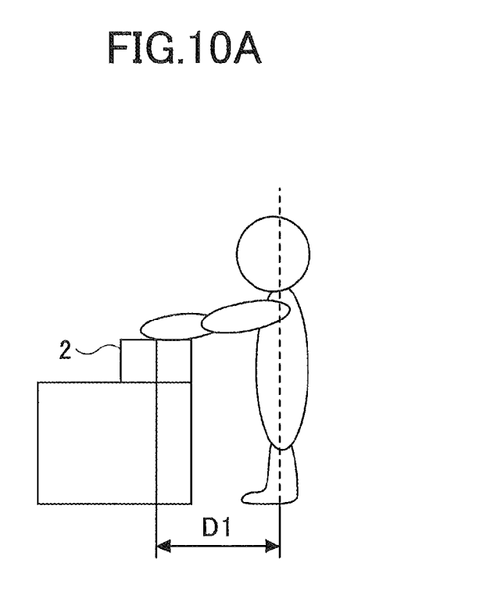
FIGS. 10A to 10D are diagrams illustrating a relationship in rotations of humans hands between a small person and a large person, where FIGS. A and B illustrate a small person's case and FIGS. C and D illustrate a large person's case.
Figure 10B:
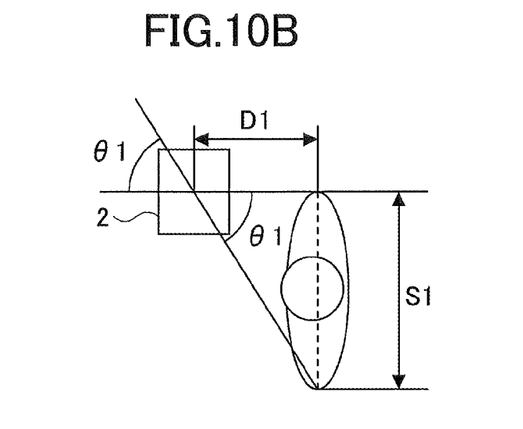
Figure 10C:
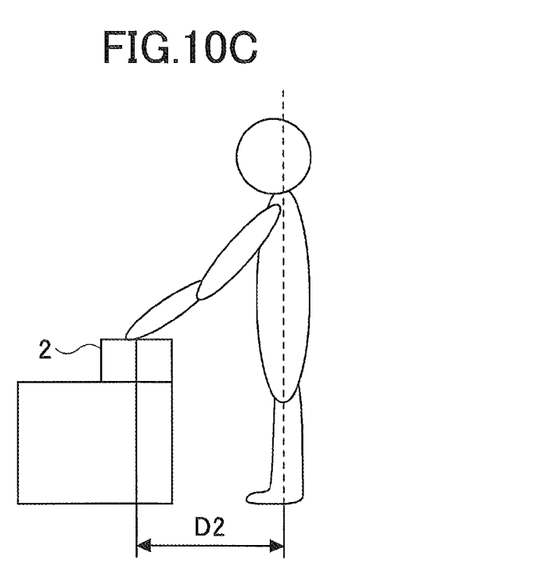
Figure 10D:
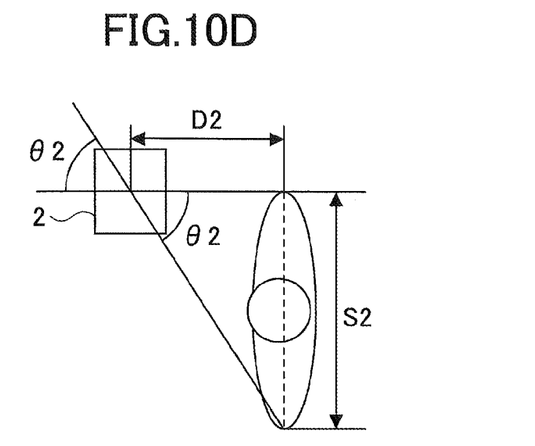

The following illustration describes a reason indicating that the prediction rotational angle θ increases as the size of the body increases. As illustrated in FIG. 10A, when the person to be authenticated has a small size body, the reading sensor 2 is located at an approximately same height as the position of the shoulder of the person. As illustrated in FIG. 10C, when the person to be authenticated has a large size body, the reading sensor 2 is located below the shoulder of the person.

It is assumed that the reading sensor 2 is located at the same height as the position of the shoulders of both the person having a large size body and the person having a small size body. That is, it is assumed that the person having a large size body is also in a state illustrated in FIG. 10A. This indicates that the overall image in the FIG. 10A is equally enlarged. In this case, an angle θ formed when the left hand is held over the reading sensor 2 (corresponding an angle θ1 in FIG. 10B) may be the same regardless of the large and small sizes of the bodies. This is because sizes (lengths) of the respective portions of the body appear to be proportionally increased as a whole.

However, in most cases, the reading sensor 2 is placed at a predetermined height in practical operations. Hence, the person having a large size body needs to stand closer to the reading sensor 2 than the person having a small size body to eliminate the difference in height between the shoulder and the reading sensor 2. As a result, the angle θ for the person having a large size body is greater than that for the person having a small size body. The reason for this is illustrated below.

In the example of the person having a small size body illustrated in FIG. 10A, when R1 represents the length of the arm, the distance D1 of the horizontally stretched arm is approximately the same as the length R1 (D1≈R1). On the other hand, in the example of the person having a large size body illustrated in FIG. 10C, when R2 represents the length of the arm, the distance D2 of the horizontally stretched arm is shorter than the length R2 (D2<R2). This is because the person having a large body needs to downwardly stretch the arm. In this case, an angle θ formed when the left hand is held over the reading sensor 2 is calculated as follows.

$$\theta 1 = \arctan(S1/D1) \approx \mathrm{atan}(S1/R1)$$

$$\theta 2 = \arctan(S2/D2) \approx \mathrm{atan}(S2/R2)$$

In the above formulas, proportions of the lengths of the arm (R1, R2) to the widths of the bodies (S1, S2) appear to be relatively constant, and hence, there is a relationship represented by S1/R1≈S2/R2. Accordingly, the relationship represented by θ1<θ2 is finally obtained. Further, the coefficients a and b in the formula (1) may be varied between the case where the person to be authenticated uses the reading sensor 2 while standing and the case where the person to be authenticated uses the reading sensor 2 while sitting. That is, the prediction rotational angle θ may be more likely to be increased due to an increase in the size (height) of the body in the case where the person to be authenticated uses the reading sensor 2 while standing compared to the case where the person to be authenticated uses the reading sensor 2 while sitting. Hence, highly accurate biometric authentication may be carried out by applying appropriate values to the coefficients a and b depending on the case where the person is standing and the case where the person is sitting.

Further, a fixed value may be set in the prediction rotational angle θ. For example, the prediction rotational angle θ may be less likely to be increased due to an increase in the size (height) of the body in the case where the person to be authenticated uses the reading sensor 2 while sitting compared to the case where the person to be authenticated uses the reading sensor 2 while standing. Thus, a fixed value may be set as the prediction rotational angle θ when the person to be authenticated uses the reading sensor 2.

The direction of the prediction rotational angle θ, that is, a rotational direction of the hand in the second data acquisition may vary according to one of the left and the right hands being first held over the reading sensor 2. The direction of the prediction rotational angle θ may be reversed between the case where the right hand is held first and the left hand is held next and the case where the left hand is held first and the right hand is held next.

Hence, whether the hand subject to the first data acquisition is the left or the right hand is determined. In this case, whether the hand subject to the first data acquisition is the left or the right hand is determined based on the shape characteristics data F10. However, the accuracy in the determination of the left or the right hand based on the shape characteristics data is not high. Hence, in the first embodiment, whether the hand subject to the first data acquisition is the left or the right hand is determined based on the shape characteristics data F10. As described above, since the operator intervenes in the registration, the operator or the like may save in the server 3 the authentication characteristics data V1 in association with the left-right information. Alternatively, it may be predetermined that the data are acquired in the order from the right hand to the left hand at the registration. The authentication characteristics data may differ between the right hand and the left hand. Thus, the authentication characteristics data V10 in the first data acquisition and the registered authentication characteristics data V1 are compared to determine whether the matched authentication characteristics data belongs the left or the right hand. As a result, whether the hand subject to the first data acquisition is the left or the right hand is determined. When the hand subject to the first data acquisition is the right hand, the second data acquisition is performed by using the left hand. Hence, the prediction rotational angle θ is +. When the hand subject to the first data acquisition is the left hand, the second data acquisition is performed by using the right hand. Hence, the prediction rotational angle θ is −.

In step S210, the server 3 identifies the acquired authentication characteristics data V10. The fingerprint matching part 35 and the vein matching part 36 of the server 3 may turn the matching authentication characteristics data V20 by the prediction rotational angle θ before the second matching process (offset setting).

The matching may be susceptible to failing when the rotational angle between the registered authentication characteristics data and the matching authentication characteristics data increases. A search range of the rotational angle at the matching process may be increased; however, this may increase the load of the authentication process. Further, when matching is performed by increasing the search range of the rotational angle, respective data of different third parties may be matched with each other with high probability. As a result, a false acceptance rate "FAR" may be raised. That is, despite the fact that the authentication characteristics data respectively belong to the different third parties, similarities between the two units of the authentication characteristics data may be increased with high probability by applying different rotational angles to match the two units of the authentication characteristics data.

Hence, when it may be predicted that the authentication characteristics data V20 subject to the second data acquisition are rotated by +20 degrees based on the authentication characteristics data V1 subject to the first data acquisition, the authentication characteristics data V20 may be corrected by turning −20 degrees, and the turned authentication characteristics data V20 are matched with the registration authentication characteristics data V2 while searching the neighboring range (e.g., ±5 degrees). Further, a similar process may be applied to the shape characteristics data.

As described above, it may be possible to reduce the calculation time, enhance responsiveness to the person to be authenticated, and improve the convenience of the biometric authentication system by applying the offset setting. In this configuration, the process requiring similar processing time may be performed by a server having less processing capability. Hence, cost-effective performance may be improved. Further, it may be possible to decrease the search range of the rotational angle as well as reducing FAR.

The fingerprint matching part 35 and the vein matching part 36 of the server 3 perform the matching process of extracting data that match the acquired authentication characteristics data V20 turned by the prediction rotational angle θ in a predetermined range from the registration authentication characteristics data V2 registered in a storage. Hence, the time required for the extraction of the match may be reduced, thereby accurately performing a matching process at a high speed. From the registration authentication characteristics data V2 that match the acquired authentication characteristics data V20, an ID corresponding to a person to be authenticated, and left-right information indicating that the registration authentication characteristics data V1 are associated with one of the left and right hand of the person is specified. Then, the ID of the person to be authenticated corresponding to the authentication characteristics data V20, and the left-right information of the hand are transmitted from the server 3 to the client 1.

In step S211, the client controller 11 performs authentication. In step S202, the ID of the person to be authenticated and the left-right information of the hand corresponding to the authentication characteristics data V10 transmitted to the client 1, and the ID of the person to be authenticated and the left-right information of the hand corresponding to the authentication characteristics data V20 transmitted to the client 1 are determined. When the two IDs of the person to be authenticated are matched and the respective left-right information of the hand indicate opposite hands, the person subject to the first data acquisition and the person subject to the second data acquisition are determined to be an identical person to be authenticated ("YES" in step S211).

When the determination indicates a successful authentication, the matching process ends as the authentication being succeeded (step S212). On the other hand, when the determination indicates a unsuccessful authentication, the matching process ends as the authentication being a failure (step S213).

The input order of the left and the right hands to be authenticated may be the right hand first and the left hand next, or the left hand first and the right hand next.

The first embodiment describes a combination of the fingerprints and the palm veins as the biometric information. However, the biometric information is not limited to this example, and may be a recombination of finger veins or palm prints, or a combination of the finger veins and the palm prints.

Further, step S207 is processed by the client 1 in order to reduce the process load imposed on the server 3 and the communications channel 5 such as a network, and hence, step S207 may be processed by the server 3.

Moreover, the registration process in steps S101 and S102 and the registration process in steps S201 and S202 may be performed different reading sensors. Further, the matching process in steps S103 to S107 and step S109, the matching process in steps S203 to S207, step S209, and steps S211 to S213 may be performed by different clients.

Within the first embodiment, the number of the characteristics data for one person may be increased by using one sensor for performing the biometric authentication on both the left and right hands. Hence, it possible to reduce a false acceptance rate "FAR".

Second Embodiment

Figure 11:
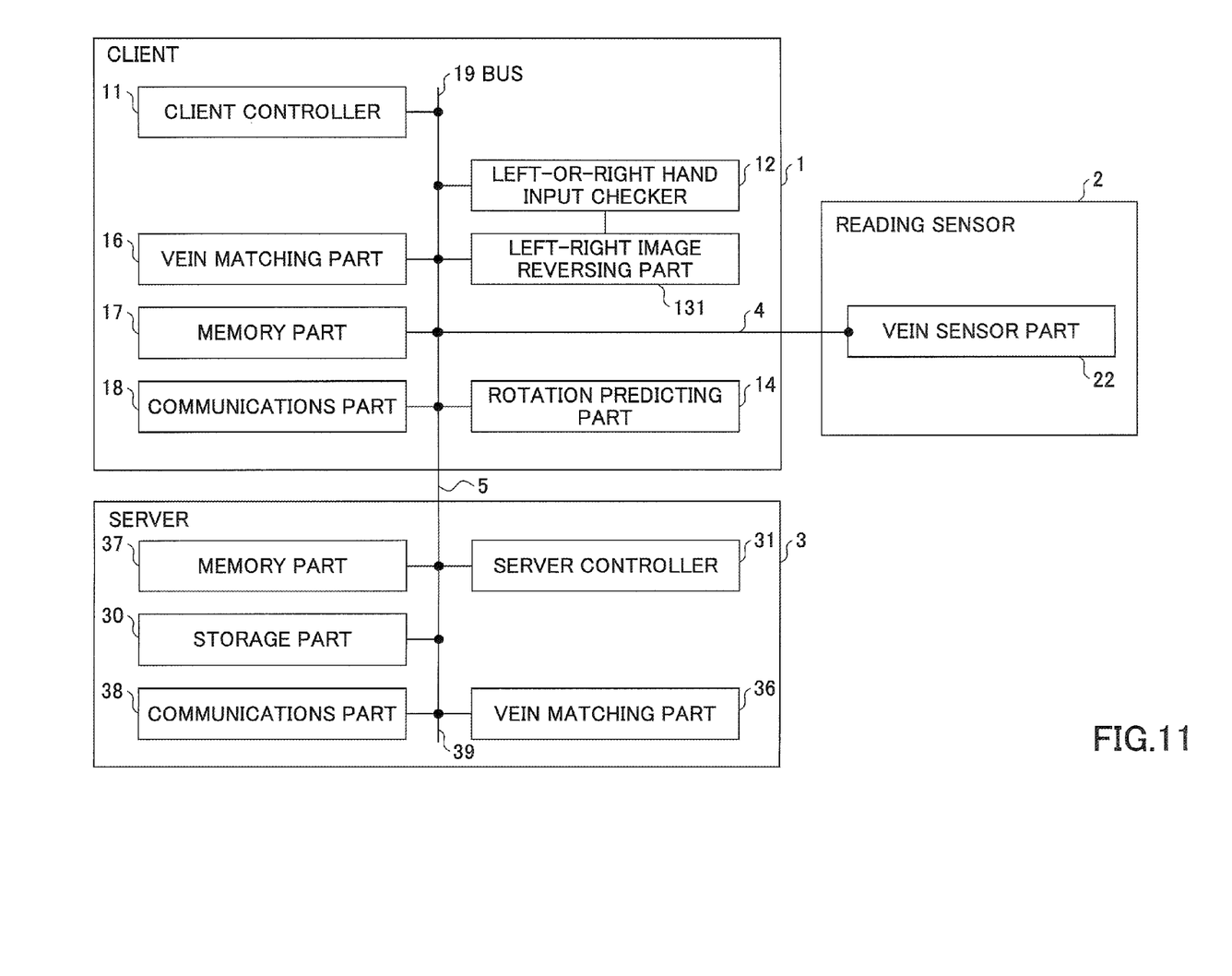
FIG. 11 is a diagram illustrating a configuration example of a biometric authentication system in a second embodiment.

Within the second embodiment, only the vein sensor part 22 is used as the reading sensor 2. FIG. 11 is a diagram illustrating a configuration example of a biometric authentication system in the second embodiment. An illustration is given of the configuration example of the biometric authentication system in the second embodiment with reference to FIG. 11.

In FIG. 11 for describing the second embodiment, components having functions the same as FIG. 1 are provided with reference numbers identical to those of FIG. 1, and a duplicated description is omitted from the specification. The second embodiment differs from the first embodiment in that the second embodiment of the biometric authentication system does not include the fingerprint sensor part 21, the fingerprint matching part 15, the left-right corresponding table 13, or the fingerprint matching part 35, and includes a left-right image reversing part 131.

The left-right image reversing part 131 is configured to mirror reverse (left-right image reverse) the shape characteristics data subject to the data acquisition in step S105 in FIG. 4 and in step S206 in FIG. 7. The shape characteristics data handled by the left-right image reversing part 131 may be obtained by a contour shape of the palm, for example. Specifically, an image of the contour of the palm is traced, and a Fourier descriptor of a contour line may be used as the shape characteristics data. Alternatively, moment is calculated based on an image of an overall shape of the palm, and the calculated moment may be used as the shape characteristics data. The reference for the characteristics amount of the image of the hand shape may, for example, be cited on pages 246 to 253 of "R. M. Luque, D. Elizondo, E. Lopez-Rubio and E. J. Palomo, "GA-Based Feature Selection Approach In Biometric Hand Systems", Proceedings of International Joint Conference on Neural Networks, San Jose, Calif., USA, Jul. 31-Aug. 5, 2011, 2011IEEE". The characteristics amounts may be used as the shape characteristics.

The left-right image reversing part 131 may apply mirror reverse (left-right image reverse) of the shape characteristics data obtained from the above-described image to the subject of the first data acquisition or to the subject of the second data acquisition. When a reverse process is performed on the shape characteristics data F1 or F10 subject to the first data acquisition, the shape characteristics data F2 or F20 subject to second data acquisition may be acquired in parallel with performing the reversing process on the shape characteristics data F1 or F10 subject to the first data acquisition. As a result, a response may be quickened so as to perform the authentication of the person to be authenticated in a short time.

In step S106 of FIG. 4, the client controller 11 and the left-or-right hand input checker 12 compare the shape characteristics data reversed by the left-right image reversing part 131 and the shape characteristics data of the other hand to see whether the reversed shape characteristics data match the shape characteristics data of the other hand in a predetermined range. When the reversed shape characteristics data do not match the shape characteristics data of the other hand in the predetermined range ("NO" in step S106), step S107 is processed. When the reversed shape characteristics data F1' match the shape characteristic data F2 in the predetermined range ("YES" in step S106), step S108 is processed.

Further, in step S207 of FIG. 7, the client controller 11 and the left-or-right hand input checker 12 compare the reversed shape characteristics data and the shape characteristics data of the other hand to see whether the reversed shape characteristics data match the shape characteristics data of the other hand in a predetermined range. When the reversed shape characteristics data F10' do not match the shape characteristic data F20 in the predetermined range ("NO" in step S207), step S208 is processed. When the reversed shape characteristics data F10' match the shape characteristic data F20 in the predetermined range ("YES" in step S207), step S209 is processed. Although an illustration of other steps is omitted, these steps are conducted to perform the authentication by following the flowchart of the matching process in FIG. 7.

Note that the person to be authenticated may have defects in his or her fingers, so that fingerprints are not available as the biometric information in such a case. Even in such a case, the biometric system according to the second embodiment may be able to perform the authentication with higher accuracy by using the biometric information of the identical portions of both hands to increase the matching accuracy, thereby reducing the false acceptance rate FAR.

In the above embodiments, the fingerprints and the palm veins are illustrated as examples of the biometric information to be matched. However, the biometric information is not limited to these examples. For example, palm prints or finger veins may be used as the biometric information.

Further, in the above embodiments, the shape characteristics data are used for determining whether the hand held over the reading sensor is the left hand or the right hand. However, the shape characteristics data of the left hand and those of the right hand may be configured to be used in the authentication process.

According to the biometric system of the above-described embodiments, the biometric authentication of both hands may be performed by one sensor.

As described above, the examples and embodiments have been described in detail; however, it should not be construed that the present invention is limited to those specific examples and embodiments described above. Various changes or alternations may be made within the scope of the invention.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A biometric authentication apparatus comprising:
   a single reading sensor configured to acquire first matching authentication characteristics data being unique to a first hand and used for matching, and second matching authentication characteristics data being unique to a second hand and used for matching; and
   a computer configured to execute a process including:
   transmitting to a server the first and second matching authentication characteristics data for one person as authentication data;
   calculating a prediction rotational angle of a difference between an angle of the first hand relative to the reading sensor for acquiring the first matching authentication characteristics data and an angle of the second hand relative to the reading sensor for acquiring the second matching authentication characteristics data;
   transmitting to the server the calculated prediction rotational angle; and
   receiving an authentication result from the server.

2. The biometric authentication apparatus as claimed in claim 1,
   wherein the reading sensor is configured to further acquire a first matching shape characteristics data representing a shape of the first hand, and
   the calculating includes calculating a size of the first hand based on the shape of the first hand acquired by the reading sensor, and calculating the prediction rotational angle based on the calculated size of the first hand.

3. The biometric authentication apparatus as claimed in claim 1, wherein the process further includes:
   comparing the first matching authentication characteristics data with the second matching authentication characteristics data to determine whether the first matching authentication characteristics data and the second matching authentication characteristics data are identical,
   wherein the comparison of the first matching authentication characteristics data with the second matching authentication characteristics data is stopped upon determination that the first matching authentication characteristics data and the second matching authentication characteristics data are identical.

4. The biometric authentication apparatus as claimed in claim 3, wherein the process further includes:
   outputting a message encouraging that the second hand differing from the first hand is held over the reading sensor upon stopping of the comparison of the first matching authentication characteristics data with the second matching authentication characteristics data.

5. The biometric authentication apparatus as claimed in claim 1, wherein the process further includes:
- determining whether the first and second matching authentication characteristics data are acquired based on the first and second hands of a same person,
- wherein the reading sensor is configured to simultaneously acquire the first matching authentication characteristics data and the first matching shape characteristics data representing a shape of the first hand, and to simultaneously acquire the second matching authentication characteristics data and the second matching shape characteristics data representing a shape of the second hand, and
- wherein the process further includes:
- calculating mirror reversed first matching shape characteristics data;
- comparing the calculated result and the second matching shape characteristics data to determine whether the calculated result matches the second matching shape characteristics data in a predetermined range; and
- determining, upon the determination that the calculated result does not match the second matching shape characteristics data in the predetermined range, that the second matching shape characteristics data is not acquired based on the second hand differing from the first hand of the same person to stop the comparison between the calculated result and the second matching shape characteristics data to determine whether the calculated result matches the second matching shape characteristics data in the predetermined range.

6. The biometric authentication apparatus as claimed in claim 5,
- wherein the process further includes:
- outputting a message encouraging that the second hand differing from the first hand of the same person is held over the reading sensor upon the stopping of the comparison between the calculated result and the second matching shape characteristics data to determine whether the calculated result matches the second matching shape characteristics data in the predetermined range.

7. A biometric authentication system comprising:
- a server; and
- a biometric authentication apparatus including
- a reading sensor configured to acquire first matching authentication characteristics data being unique to a first hand and used for matching, and second matching authentication characteristics data being unique to a second hand and used for matching, and
- a computer configured to execute a process including:
- transmitting to the server the first and second matching authentication characteristics data and to receive successful authentication;
- calculating a prediction rotational angle of a difference between an angle of the first hand relative to the reading sensor for acquiring the first matching authentication characteristics data and an angle of the second hand relative to the reading sensor for acquiring the second matching authentication characteristics data;
- transmitting to the server the calculated prediction rotational angle; and
- receiving an authentication result from the server, and the server including
- a server computer configured to execute a server process including:
- receiving the first matching authentication characteristics data and the second matching authentication characteristics data from the biometric authentication apparatus;
- storing first registration authentication characteristics data unique to the first hand, and second registration authentication characteristics data unique to the second hand;
- determining authentication as being successful upon detecting a result indicating that the first registration authentication characteristics data matches the first matching authentication characteristics data in a predetermined range, and the second registration authentication characteristics data matches the second matching authentication characteristics data in a predetermined range; and
- transmitting the successful authentication to the biometric authentication apparatus.

8. The biometric authentication system as claimed in claim 7, wherein the server externally acquires the first and second registration authentication characteristics data to store the acquired first and the second registration authentication characteristics data.

9. A biometric authentication method comprising:
- causing a reading sensor to acquire first matching authentication characteristics data being unique to a first hand and used for matching, and second matching authentication characteristics data being unique to a second hand and used for matching;
- causing an apparatus to transmit the first and second matching authentication characteristics data from the reading sensor, and causing a server to receive the first and second matching authentication characteristics data transmitted by the apparatus;
- causing the apparatus to calculate a prediction rotational angle of a difference between an angle of the first hand relative to the reading sensor for acquiring the first matching authentication characteristics data and an angle of the second hand relative to the reading sensor for acquiring the second matching authentication characteristics data;
- causing the apparatus to transmit to the server the calculated prediction rotational angle, and causing the server to receive the calculated prediction rotational angle from the apparatus;
- causing the server to determine whether first registration authentication characteristics data unique to the first hand matches the first matching authentication characteristics data in a first predetermined range;
- causing the server to determine whether second registration authentication characteristics data unique to the second hand matches the second matching authentication characteristics data in a second predetermined range; and
- causing the server to transmit successful authentication to the apparatus, upon detecting a result indicating that the first registration authentication characteristics data matches the first matching authentication characteristics data in the first predetermined range, and the second registration authentication characteristics data matches the second matching authentication characteristics data in the second predetermined range.

* * * * *